United States Patent
Su et al.

(10) Patent No.: US 12,151,184 B2
(45) Date of Patent: Nov. 26, 2024

(54) DEVICE FOR EXTRACTING POLYSACCHARIDE FROM ACAUDINA MOLPADIOIDES

(71) Applicant: Wenzhou University, Wenzhou (CN)

(72) Inventors: Laijin Su, Wenzhou (CN); Mingjiang Wu, Wenzhou (CN); Xiaojing Chen, Wenzhou (CN); Huicheng Yang, Wenzhou (CN); Shiwei Hu, Wenzhou (CN)

(73) Assignee: Wenzhou University, Wenzhou (CN)

( * ) Notice: Subject to any disclaimer, the term of this patent is extended or adjusted under 35 U.S.C. 154(b) by 612 days.

(21) Appl. No.: 17/483,861

(22) Filed: Sep. 24, 2021

(65) Prior Publication Data
US 2022/0096959 A1    Mar. 31, 2022

(30) Foreign Application Priority Data
Sep. 27, 2020   (CN) .......................... 202011029814.X (51) Int. Cl.
*B01D 11/02* (2006.01)
*B01F 31/00* (2022.01)
*B01F 35/31* (2022.01)

(52) U.S. Cl.
CPC ...... *B01D 11/0261* (2013.01); *B01D 11/0257* (2013.01); *B01F 31/56* (2022.01); *B01F 35/31* (2022.01)

(58) Field of Classification Search
CPC ..... B01D 11/00; B01D 11/02; B01D 11/0215; B01D 11/0253; B01D 11/0257; B01D 11/0261; B01F 31/00; B01F 31/20; B01F 31/24; B01F 31/44; B01F 31/441; B01F 31/56; B01F 31/70; B01F 35/00; B01F 35/30; B01F 35/31
See application file for complete search history.

(56) References Cited

FOREIGN PATENT DOCUMENTS

| CN | 210229934 U | 4/2020 |
|---|---|---|
| CN | 210415059 U | 4/2020 |

OTHER PUBLICATIONS

CN 209871809 U with machine translation (Year: 2019).*
CN 209917760 U with machine translation (Year: 2020).*
CN 210448171 U with machine translation (Year: 2020).*
(Continued)

*Primary Examiner* — Natasha E Young
(74) *Attorney, Agent, or Firm* — Grogan, Tuccillo & Vanderleeden, LLP (57) ABSTRACT

A device for extracting polysaccharide from *Acaudina molpadioides* is provided, which includes a mixing box, a blocking cover, a feed pipe group, a discharge pipe, a bottom plate, a side plate, a first motor, a first transmission shaft, two drive shafts, a first circular gear, two second circular gears, two rotary discs, two connecting frame groups, two semiarc rotary discs, a slide bar, a stop collar, a fixed link, a baffle, a first bushing group and a first sleeve spring group. A top side wall and a rear lower side of the mixing box are communicated with the feed pipe group and the discharge pipe, respectively. Front side and rear sides of the slide bar are longitudinally connected with multiple first engaging teeth. Both the two semiarc rotary discs are connected with multiple second engaging teeth. The fixed link is connected between the stop collar and the slide bar.

10 Claims, 5 Drawing Sheets

(56) References Cited

OTHER PUBLICATIONS

Machine translation of abstract and claim 1 of CN_210415059_U provided in IDS filed on Sep. 13, 2024 (Year: 2020).*
Author: Kirsefnikov, C.H., Title: Institution, Date: 1976, pp. 4-5, vol. 2, Publisher: China National Machinery Press and National Defense Industry Press, Beijing, China.
Chinese Office Action dated Dec. 2, 2021 from corresponding China Application No. 202011029814.X.

* cited by examiner

DEVICE FOR EXTRACTING POLYSACCHARIDE FROM ACAUDINA MOLPADIOIDES

CROSS REFERENCE TO RELATED APPLICATION

This patent application claims the benefit and priority of Chinese Patent Application No. 202011029814.X, entitled "Device for Extracting Polysaccharide from *Acaudina molpadioides*" filed on Sep. 27, 2020, the disclosure of which is incorporated by reference herein in its entirety as part of the present application.

TECHNICAL FIELD

The present disclosure relates to the technical field of accessory devices for extracting polysaccharide, and in particular to a device for extracting polysaccharide from *Acaudina molpadioides*.

BACKGROUND ART

It is well known that *Acaudina molpadioides* belongs to caudinidae, *Acaudina*, and is distributed in the Bay of Bengal, Sri Lanka, Indonesia, the Philippines, Australia, Japan, an area from Shandong to Hainan of China, and other places. As an important ingredient of body walls of the *Acaudina molpadioides*, polysaccharide has multiple bioactive functions, such as anti-coagulation, anti-hyperlipidemia, tumor inhibition and immunocompetence regulation. Therefore, it is quite necessary to extract the polysaccharide from the body walls of the *Acaudina molpadioides*. During extraction operation, a large amount of operation solution is prepared and mixed for washing and soaking the *Acaudina molpadioides*. Conventionally, multiple types of raw material solution are put in a same vessel for standing and mixing. However, such manner may make the raw material solution difficult to be mixed uniformly, resulting in poor using effect.

SUMMARY

To solve the above technical problem, the present disclosure provides a device for extracting polysaccharide from *Acaudina molpadioides*, which is capable of easily and uniformly mixing raw material solution to improve the using effect of the raw material solution.

The device for extracting polysaccharide from *Acaudina molpadioides* includes a mixing box, a blocking cover, a feed pipe group, a discharge pipe, a bottom plate, a side plate, a first motor, a first transmission shaft, two drive shafts, a first circular gear, two second circular gears, two rotary discs, two connecting frames, two semiarc rotary discs, a slide bar, a stop collar, a fixed link, a baffle, a first bushing group and a first sleeve spring group. A mixing chamber is formed in the mixing box. An access hole is communicatively formed in a front side of the mixing box and a blocking cover is screwed at the access hole via bolts. A top side wall and a rear lower side of the mixing box are communicated with the feed pipe group and the discharge pipe, respectively. Communication valves are arranged on both the feed pipe group and the discharge pipe. The side plate is arranged on a right side of a top end of the bottom plate. The first motor is arranged on a right side of the side plate. A first through slot is communicatively formed in the side plate, and a first bearing pedestal is arranged in the first through slot. A first ball bearing is rotatably connected in the first bearing pedestal. A right end of the first transmission shaft is connected with a left output end of the first motor, and a left end of the first transmission shaft passes through the first ball bearing and extends to a left side of the side plate to be connected with a center of the first circular gear. The first transmission shaft is in interference fit with an interior of the first ball bearing. Two second bearing pedestals are arranged and at the left side of the side plate in the front-rear direction, and second ball bearings are rotatably connected in both the two second bearing pedestals. Right ends of the two drive shafts are in interference fit with interiors of the two second ball bearings, respectively. Centers of the two second circular gears are fixedly sleeved outside the two drive shafts, respectively. Both the two second circular gears are engaged with the first circular gear. Left ends of the two drive shafts are connected with centers of the two rotary discs, respectively. The two semiarc rotary discs are connected with the two rotary discs through two connecting frames, respectively. Both a front side and a rear side of the slide bar are longitudinally connected with multiple first engaging teeth. Both the two semiarc rotary discs are connected with multiple second engaging teeth. Those of the multiple first engaging teeth located on the front side of the slide bar are engaged with those of the multiple second engaging teeth located on a front disc of the two semiarc rotary discs, or those of the multiple first engaging teeth located on a rear side of the slide bar are engaged with those of the multiple second engaging teeth located on a rear disc of the two semiarc rotary discs. The stop collar collar is fixedly sleeved outside the mixing box. The fixed link is connected between the stop collar collar and the slide bar. The baffle is connected with the top end of the bottom plate through the first bushing group and the first sleeve spring group. The first sleeve spring group is sleeved outside the first bushing group. And the baffle is located right below the mixing box.

In some embodiments, the device for extracting polysaccharide from *Acaudina molpadioides* may further include a lead screw, a slider, a connecting shaft and multiple agitating blades. A second through slot may be transversely and communicatively formed above a right side of the mixing box. A third bearing pedestal may be arranged in the second through slot, and a third ball bearing may be rotatably connected in the third bearing pedestal. A fourth bearing pedestal may be arranged above an inner left side of the mixing box, and a fourth ball bearing may be rotatably connected in the fourth bearing pedestal. A left end of the lead screw may pass through the third ball bearing and extend into the mixing box to be in interference fit with an interior of the fourth ball bearing, and the lead screw may be in interference fit with an interior of the third ball bearing. The slider may be screwed and sleeved outside the lead screw. The connecting shaft may be arranged at the bottom end of the slider. And the multiple agitating blades may be all arranged on a side wall of the connecting shaft.

In some embodiments, the device for extracting polysaccharide from *Acaudina molpadioides* may further include a second motor, a second transmission shaft, a first bevel gear, a second bevel gear, a driven shaft, a big rotary plate, a small rotary plate and a third circular gear. The second motor may be arranged on the right side of the mixing box. Two ends of the second transmission shaft may be connected with a top output end of the second motor and a center of the first bevel gear, respectively; the second bevel gear may be fixedly sleeved outside the driven shaft. The first bevel gear and the second bevel gear may be engaged with each other.

A rotary slot may be formed in a left end of the big rotary plate, the small rotary plate may be located in the rotary slot. A half circle of an inner peripheral side wall of the rotary slot and a half circle of an outer peripheral side wall of the small rotary plate may be provided with two third engaging teeth groups. The third circular gear may be engaged with one group of third engaging teeth of the two third engaging teeth groups. Both centers of the small rotary plate and the big rotary plate may be sleeved outside the driven shaft. A right end of the lead screw may be connected with a center of the third circular gear. A fifth bearing pedestal may be arranged on the right side of the mixing box, and a fifth ball bearing may be rotatably connected in the fifth bearing pedestal. And a left end of the driven shaft may be in interference fit with an interior of the fifth ball bearing.

In some embodiments, the device for extracting polysaccharide from *Acaudina molpadioides* may further include a replenishing tank, a replenishing pipe, a connecting plate, a connecting block, a second sleeve spring and a stopper. The replenishing tank may be arranged on a left side wall of the mixing box. A holding chamber may be formed in the replenishing tank. An inlet may be communicatively formed in a top end of the replenishing tank. A top input end of the replenishing pipe may be hermetically communicated with a bottom end of the replenishing tank. An output end of the replenishing pipe may be hermetically communicated with the left side wall of the mixing box. The connecting block may be connected with the inner left side of the mixing box by the connecting plate. The stopper may be connected with the connecting block by the second sleeve spring and the second bushing. The second sleeve spring may be sleeved outside the second bushing. And the stopper may be closely attached to an output end of the replenishing pipe.

In some embodiments, a limit rod may be connected between lower left and right sides inside the mixing box. A bottom end of the connecting shaft may be connected with a connecting sheet which may be transversely provided with a third through slot, and a first ball group may be rotatably arranged inside the third through slot. A right end of the limit rod may pass through the first ball group and extends to an outside of the connecting sheet. A bottom end of the connecting sheet may be connected with a first universal wheel group. And a bottom end of the first universal wheel group may be closely attached to an inner bottom side of the mixing box.

In some embodiments, the device for extracting polysaccharide from *Acaudina molpadioides* may further include a push plate, a push rod, and a push block. A top end of the push rod may be connected with the push plate. A bottom end of the push rod may be connected with the push block. A sealing layer may be sleeved outside the push block, and may be closely attached to an inner side wall of the holding chamber.

In some embodiments, a left side of the top end of the bottom plate may be connected with an auxiliary plate. Two first sliding slots may be longitudinally arranged on a right side of the auxiliary plate and the left side of the side plate. Two first sliding columns may be slidably provided at the two first sliding slots respectively. The two first sliding columns may be connected with a fixed ring and the slide bar, respectively. A chain may be connected between the auxiliary plate and the mixing box. A second sliding slot may be transversely formed in a bottom end of the connecting plate, and a second sliding column may be slidably provided in the second sliding slot. And the second sliding column may be connected with a top end of the stopper.

In some embodiments, reinforcing column groups may be connected between the first motor and the side plate as well as between the second motor and the mixing box. The right side of the mixing box may be connected with a transverse plate. A second universal wheel may be arranged at a top end of the transverse plate, and may be closely attached to a bottom end of the big rotary plate. And a cushion pad may be arranged at a top end of the transverse plate, and may be located right below the second motor.

In some embodiments, the bottom plate may be longitudinally provided with a fourth through slot, and a second ball group may be rotatably connected in the fourth through slot. A bottom end of the slide bar may pass through the second ball group and extends to a position below the bottom plate. A left front side, a right front side, a left rear side and a right rear side of a bottom end of the bottom plate may be all connected with stands. And bottom ends of four stands may be all connected with non-slip mats.

In some embodiments, a view port may be formed in a front side wall of the mixing box. And a transparent plate may be hermetically arranged on the view port.

Compared with the prior art, the embodiments have the beneficial effects as follows. Raw material solution and mixed solution can be fed and discharged through the feed pipe group and the discharge pipe, respectively. The access hole can be conveniently opened for manual maintenance. After feeding, the first motor is started to drive the first circular gear on the first transmission shaft to rotate. Due to the engaging, the two second circular gears rotate in the same direction along with the first circular gear to drive the two semiarc rotary discs on the two rotary discs to rotate in the same direction. When those teeth of the multiple first engaging teeth located on the front side of the slide bar are engaged with those teeth of the multiple second engaging teeth located on the front disc, the slide bar continuously slides upwards, and when those teeth of the multiple first engaging teeth located on the rear side of the slider bar are engaged with those teeth of the multiple second engaging teeth located on the rear disc, the slide bar continuously slides downwards. The slide bar longitudinally moves to drive the mixing box to perform longitudinal waggling, thereby further facilitating the uniform mixing. It should be noted that at a moment when those teeth of the multiple first engaging teeth located on the front side of the slide bar are not engaged with those teeth of the multiple second engaging teeth located on the front disc any more, those of the multiple first engaging teeth located on the rear side of the slide bar start to be engaged with those teeth of the multiple second engaging teeth located on the rear disc, and at a moment when those teeth of the multiple first engaging teeth located on the rear side of the slide bar are not engaged with those teeth of the multiple second engaging teeth located on the rear disc any more, those teeth of the multiple first engaging teeth located on the front side of the slide bar start to be engaged with those teeth of the multiple second engaging teeth located on the front disc, so that the mixing box waggles longitudinally when the first motor is started. Both the first ball bearing and the second ball bearing can rotate conveniently to decrease friction and improve the support effect, so that the raw material solution is easily and uniformly mixed, and the using effect thereof is improved. In addition, the first sleeve spring group drives the baffle to perform buffering at a moment when the mixing box drops accidentally, so as to improve using reliability of the mixing box. And under the assistance of the first bushing group, the first sleeve spring group is difficult to twist and deform.

List of the reference characters: 1 mixing box; 2 blocking cover; 3 feed pipe group; 4 discharge pipe; 5 bottom plate; 6 side plate; 7 first motor; 8 first transmission shaft; 9 drive shaft; 10 first circular gear; 11 second circular gear; 12 rotary disc; 13 connecting frame group; 14 semiarc rotary disc; 15 slide bar; 16 stop collar; 17 fixed link; 18 baffle; 19 first sleeve spring group; 20 lead screw; 21 slider; 22 connecting shaft; 23 agitating blade; 24 second motor; 25 second transmission shaft; 26 first bevel gear; 27 second bevel gear; 28 driven shaft; 29 big rotary plate; 30 small rotary plate; 31 third circular gear; 32 replenishing tank; 33 replenishing pipe; 34 connecting plate; 35 connecting block; 36 second sleeve spring; 37 stopper; 38 limit rod; 39 connecting sheet; 40 first universal wheel group; 41 push plate; 42 push rod; 43 push block; 44 sealing layer; 45 auxiliary plate; 46 first sliding column; 47 chain; 48 second sliding column; 49 reinforcing column group; 50 transverse plate; 51 second universal wheel; 52 cushion pad; 53 stand; 54 non-slip mat; and 55 transparent plate.

DETAILED DESCRIPTION OF THE EMBODIMENTS

A specific embodiment of the present disclosure is now further described in detail by way of embodiment with reference to the accompanying drawings. The following embodiment is illustrative of the present disclosure and should not be construed as limiting of the scope of the present disclosure.

As shown in FIGS. 1-7, the embodiment provides a device for extracting polysaccharide from *Acaudina molpadioides*, which includes a mixing box 1, a blocking cover 2, a feed pipe group 3, a discharge pipe 4, a bottom plate 5, a side plate 6, a first motor 7, a first transmission shaft 8, two drive shafts 9, a first circular gear 10, two second circular gears 11, two rotary discs 12, two connecting frames 13, two semiarc rotary discs 14, a slide bar 15, a stop collar 16, a fixed link 17, a baffle 18, a first bushing group and a first sleeve spring group 19. A mixing chamber is formed in the mixing box 1. An access hole is communicatively formed in a front side of the mixing box 1, and the blocking cover 2 is screwed on the access hole by bolts. A top side wall and a rear lower side of the mixing box 1 are communicated with the feed pipe group 3 and the discharge pipe 4, respectively. Communication valves are arranged at both the feed pipe group 3 and the discharge pipe 4. The side plate 6 is arranged on a right side of a top end of the bottom plate 5. The first motor 7 is arranged on a right side of the side plate 6. A first through slot is communicatively formed in the side plate 6, and a first bearing pedestal is arranged in the first through slot. A first ball bearing is rotatably connected in the first bearing pedestal. A right end of the first transmission shaft 8 is connected with a left output end of the first motor 7. And left end of the first transmission shaft 8 passes through the first ball bearing and extends to a left side of the side plate 6 to be connected with a center of the first circular gear 10. The first transmission shaft 8 is in interference fit with an interior of the first ball bearing. Two second bearing pedestals are arranged in the left side of the side plate 6 in a front-rear direction and second ball bearings are rotatably connected in both the two second bearing pedestals. Right ends of the two drive shafts 9 are in interference fit with interiors of the two second ball bearings, respectively. Centers of the two second circular gears 11 are fixedly sleeved outside the two drive shafts 9, respectively. Both the two second circular gears 11 are engaged with the first circular gear 10. Left ends of the two drive shafts 9 are connected with centers of the two rotary discs 12, respectively. The two semiarc rotary discs 14 are connected with the two rotary discs 12 through two connecting frames 13, respectively. Both front and rear sides of the slide bar 15 are longitudinally connected with a multiple first engaging teeth; both the two semiarc rotary discs 14 are connected with a multiple second engaging teeth. Those teeth of the multiple first engaging teeth located on a front side of the slide bar 15 are engaged with those teeth of the multiple second engaging teeth located on the front disc of the two semiarc rotary s 14, or those teeth of the multiple first engaging teeth located on a rear side of the slide bar 15 are engaged with those teeth of the multiple second engaging teeth located on a rear disc of the two semiarc rotary discs 14. The stop collar 16 is fixedly sleeved outside the mixing box 1. The fixed link 17 is connected between the stop collar 16 and the slide bar 15. The baffle 18 is connected with a top end of the bottom plate 5 through the first bushing group and the first sleeve spring group 19. The first sleeve spring group 19 is sleeved outside the first bushing group. And the baffle 18 is located right below the mixing box 1. According to the device for extracting polysaccharide from *Acaudina molpadioides*, raw material solution and mixed solution can be fed and discharged through the feed pipe group 3 and the discharge pipe 4, respectively. The access hole can be conveniently opened for manual maintenance. After feeding, the first motor 7 is started to drive the first circular gear 10 on the first transmission shaft 8 to rotate. Due to engaging, the two second circular gears 11 rotate in the same direction along with the first circular gear 10 to drive the two semiarc rotary discs 14 on the two rotary discs 12 to rotate in the same direction. When those teeth of the multiple first engaging teeth located on the front side of the slide bar 15 are engaged with those teeth of the multiple second engaging teeth located on the front disc, the slide bar 15 continuously slides upwards, and when those teeth of the multiple first engaging teeth located on the rear side of the slide bar 15 are engaged with those teeth of the multiple second engaging teeth located on the rear disc, the slide bar 15 continuously slides downwards. The slide bar 15 longitudinally moves to drive the mixing box 1 to perform longitudinal waggling, thereby further facilitating the uniform mixing. It should be noted that at a moment when those teeth of the multiple first engaging teeth located on the front side of the slide bar 15 are not engaged with those teeth of the multiple second engaging teeth located on the front disc any more, those of the multiple first engaging teeth located on the rear side of the slide bar 15 start to be engaged with those of the multiple second engaging teeth located on the rear disc, and at a moment when those teeth of the multiple first engaging teeth located on the rear side of the slide bar 15 are not engaged with those teeth of the multiple second engaging teeth located on the rear disc any more, those teeth of the multiple first engaging teeth located on the front side of the slide bar 15 start to be engaged with those teeth of the multiple second engaging teeth located on the front disc, so that the mixing box 1 waggles longitudinally when the first motor 7 is started. Both the first ball bearing and the second ball bearing can rotate conveniently to decrease friction and improve the support effect, so that the raw material solution is easily and uniformly mixed, and the using effect thereof is improved. In addition, the first sleeve spring group 19 drives the baffle 18 to perform buffering at a moment when the mixing box 1 drops accidentally, so as to improve the using reliability of the mixing box. And under the assistance of the first bushing group, the first sleeve spring group 19 is difficult to twist and deform.

Figure 1:
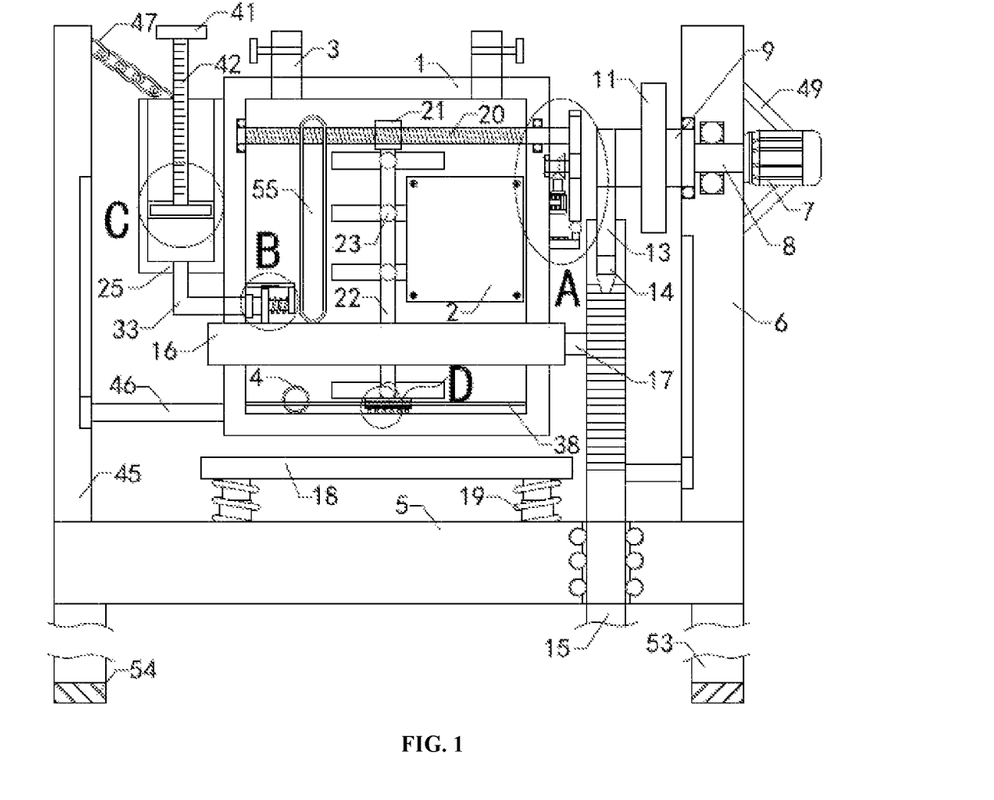
FIG. 1 is a structural schematic diagram of the present disclosure.

The device for extracting polysaccharide from *Acaudina molpadioides* further includes a lead screw 20, a slider 21, a connecting shaft 22 and a multiple agitating blades 23. A second through slot is transversely communicatively formed above a right side of the mixing box 1. A third bearing pedestal is arranged in the second through slot, and a third ball bearing is rotatably connected in the third bearing pedestal. A fourth bearing pedestal is arranged above an inner left side of the mixing box 1, and a fourth ball bearing is rotatably connected in the fourth bearing pedestal. A left end of the lead screw 20 passes through the third ball bearing and extend into the mixing box 1 to be in interference fit with an interior of the fourth ball bearing, and the lead screw 20 is in interference fit with the interior of the third ball bearing. The slider 21 is screwed and sleeved outside the lead screw 20. The connecting shaft 22 is arranged at the bottom end of the slider 21. And the multiple agitating blades 23 is arranged on a side wall of the connecting shaft 22. According to the device for extracting polysaccharide from *Acaudina molpadioides*, the multiple agitating blades 23 on the slider 21 can be driven, through rotating the lead screw 20, to move transversely, so as to facilitate and assist the uniform mixing. And both the third ball bearing and the fourth ball bearing can conveniently rotate to decrease the friction and improve the support effect.

Figure 2:
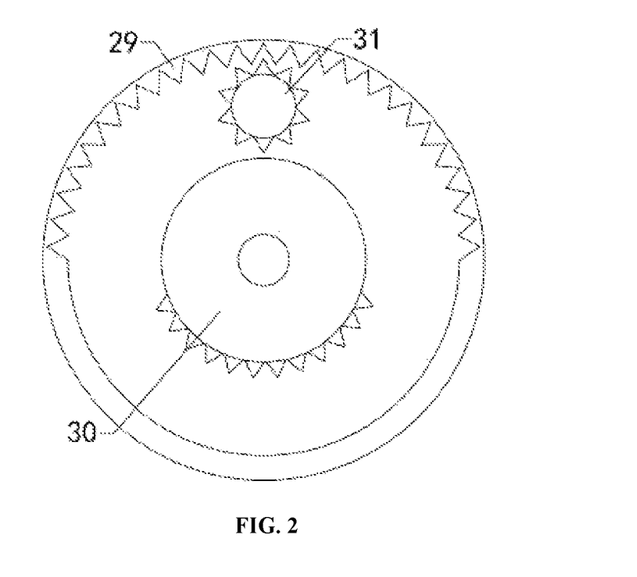
FIG. 2 is a left view of connection of a big rotary plate, a small rotary plate and a third circular gear.
Figure 3:
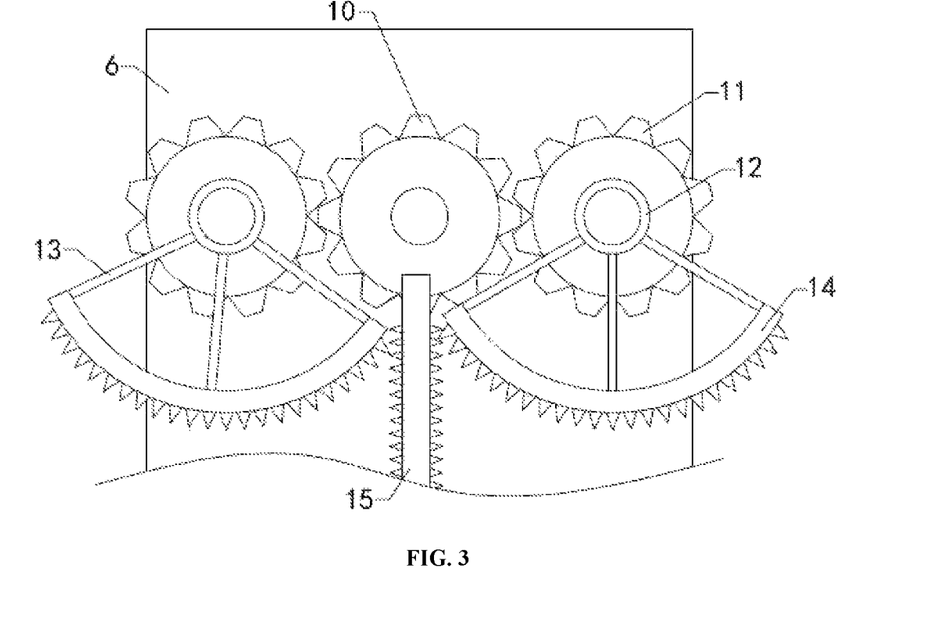
FIG. 3 is a left view of connection of a side plate, a first circular gear and second circular gears.
Figure 4:
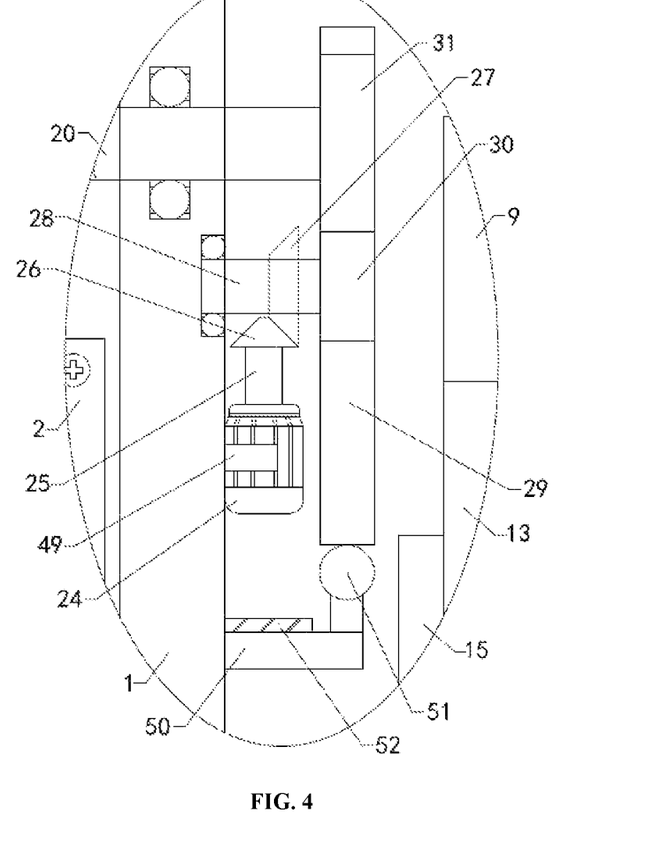
FIG. 4 is a partially enlarged view of a part A in FIG. 1.
Figure 5:
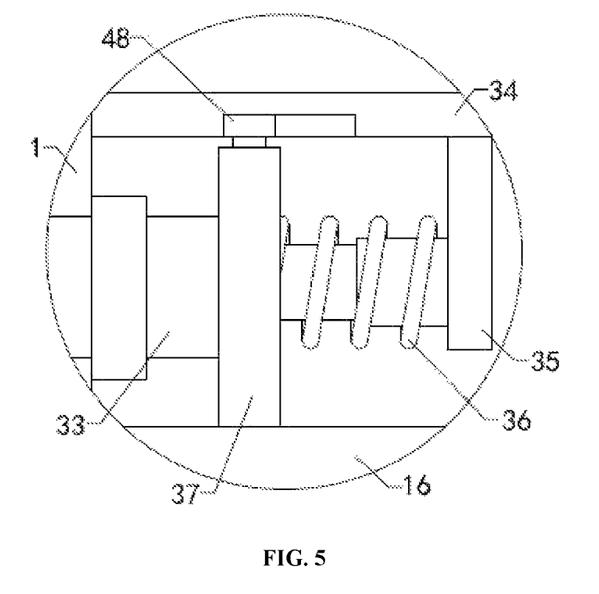
FIG. 5 is a partially enlarged view of a part B in FIG. 1.
Figure 6:
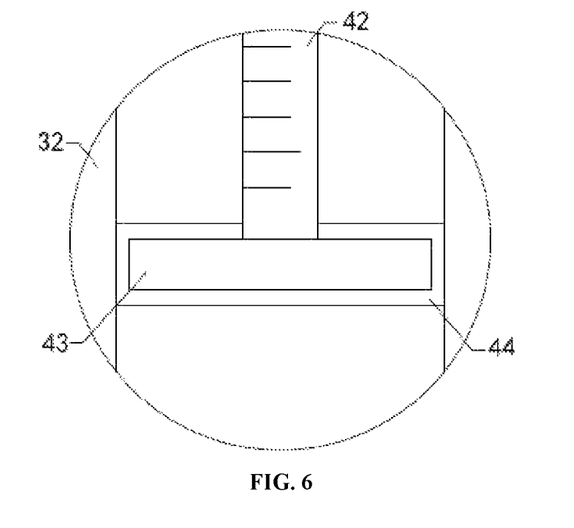
FIG. 6 is a partially enlarged view of a part C in FIG. 1.
Figure 7:
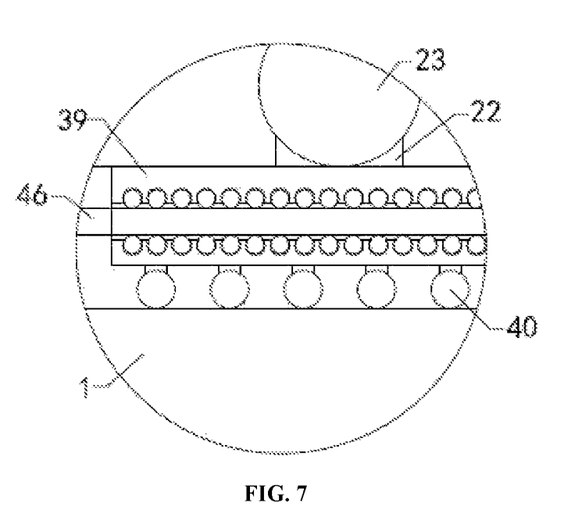
FIG. 7 is a partially enlarged view of a part D in FIG. 1.

The device for extracting polysaccharide from *Acaudina molpadioides* further includes a second motor 24, a second transmission shaft 25, a first bevel gear 26, a second bevel gear 27, a driven shaft 28, a big rotary plate 29, a small rotary plate 30 and a third circular gear 31. The second motor 24 is arranged on the right side of the mixing box 1. Two ends of the second transmission shaft 25 are connected with a top output end of the second motor 24 and a center of the first bevel gear 26, respectively. The second bevel gear 27 is fixedly sleeved outside the driven shaft 28. The first bevel gear 26 and the second bevel gear 27 are engaged with each other. A rotary slot is provided in a left end of the big rotary plate 29, and the small rotary plate 30 may be located in the rotary slot. A half circle of an inner peripheral side wall of the rotary slot and a half circle of an outer peripheral side wall of the small rotary plate 30 are provided with two third engaging teeth groups. The third circular gear 31 is engaged with one group of the two third engaging teeth. Both centers of the small rotary plate 30 and the big rotary plates 29 are sleeved outside the driven shaft 28. A right end of the lead screw 20 is connected with the center of the third circular gear 31. A fifth bearing pedestal may be arranged on the right side of the mixing box 1, and a fifth ball bearing may be rotatably connected in the fifth bearing pedestal. And a left end of the driven shaft 28 may be in interference fit with an interior of the fifth ball bearing. According to the device for extracting polysaccharide from *Acaudina molpa-dioides*, the first bevel gear 26 on the second transmission shaft can be driven, through the second motor 24, to rotate, and the engaged second bevel gear 27 drives the small rotary plate 30 and the big rotary plate 29, which are arranged on the driven shaft 28, to perform synchronous rotation, and then drives the lead screw 20 on the third circular gear 31 to rotate. The screwed slider 21 transversely moves to drive a polishing disc to transversely move in a convenient and normal manner. When the third circular gear 31 is engaged with the third engaging teeth on the small rotary plate 30, the third circular gear 31 and the small rotary plate 30 rotates in different directions, and when the third circular gear 31 is engaged with the third engaging teeth on the big rotary plate 29, the third circular gear 31 and the big rotary plate 29 rotate in a same direction. The third circular gear 31 rotates back and forth to drive the slider 21 to transversely move back and forth. And under the assistance of the fifth bearing pedestal, the driven shaft 28 is rotated more smoothly, and the support effect is improved.

The device for extracting polysaccharide from *Acaudina molpadioides* further includes a replenishing tank 32, a replenishing pipe 33, a connecting plate 34, a connecting block 35, a second sleeve spring 36, a second bushing and a stopper 37. The replenishing tank 32 is arranged on a left side wall of the mixing box 1, and a holding chamber may be formed in the replenishing tank 32. An inlet is provided in a top end of the replenishing tank 32. A top input end of the replenishing pipe 33 is hermetically communicated with a bottom end of the replenishing tank 32. An output end of the replenishing pipe 33 is hermetically communicated with the left side wall of the mixing box 1. The connecting block 35 is connected with the inner left side of the mixing box 1 by the connecting plate 34. The stopper 37 is connected with the connecting block 35 by the second sleeve spring 36 and the second bushing. The second sleeve spring 36 is sleeved outside the second bushing. And the stopper 37 is closely attached to an output end of the replenishing pipe 33. According to the device for extracting polysaccharide from *Acaudina molpadioides*, raw material solution to be replenished can be held in the replenishing tank 32. When the raw material solution is replenished, the raw material solution extrudes the stopper 37 to drive the second sleeve spring 36 to perform extrusion, so that the raw material solution can be added smoothly, and when it is unnecessary to replenish the raw material solution, the second sleeve spring 36 extrudes the stopper 37 to move leftwards to block an output end of a drain pipe on the left side, so that the raw material solution is difficult to be back sucked. Under assistance of the second bushing, the second sleeve spring 36 is difficult to twist and deform. It should be noted that the multiple agitating blades 23 do not contact with the connecting block 35 during transverse movement. The connecting plate 34, the connecting block 35, the second sleeve spring 36, the second bushing and the stopper 37 are all located between the two agitating blades 23 which are longitudinally adjacent to each other.

A limit rod 38 is connected between lower left and right sides inside the mixing box 1. A bottom end of the connecting shaft 22 is connected with a connecting sheet 39. The connecting sheet 39 is transversely provided with a third through slot, and a first ball group may be rotatably connected inside the third through slot. A right end of the limit rod 38 passes through the first ball group and extend to an outside of the connecting sheet 39. A bottom end of the connecting sheet 39 is connected with a first universal wheel group 40. And a bottom end of the first universal wheel group 40 is closely attached to an inner bottom side of the mixing box 1. According to the device for extracting polysaccharide from *Acaudina molpadioides*, the connecting sheet 39 can only transversely slide, through the limit rod 38, without rotating along with a rotation of the lead screw 20. The first ball group is capable of improving the sliding smoothness. And the first universal wheel group 40 is capable of facilitating the sliding and improving the support effect.

The device for extracting polysaccharide from *Acaudina molpadioides* further includes a push plate 41, a push rod 42, and a push block 43. A top end of the push rod 42 is connected with the push plate 41, and a bottom end of the push rod 42 is connected with the push block 43. A sealing layer 44 is sleeved outside the push block 43, and is closely attached to an inner side wall of the holding chamber. According to the device for extracting polysaccharide from *Acaudina molpadioides*, the push block 43 can be manually pulled, through the push rod 42, out from the holding chamber, so as to block the replenishing pipe 33 and guide the raw material solution into the holding chamber. And the push block 43 can be pushed, through the push rod 42, into the holding chamber. The push block 43 on the push rod 42 can be pushed, through the push plate 41, to move downwards, the replenishing amount of the raw material solution can be conveniently controlled through the replenishing pipe 33. And the sealing layer 44 is capable of improving the sealing effect and the solution inlet reliability.

A left side of the top end of the bottom plate 5 is connected with an auxiliary plate 45. Two first sliding slots are longitudinally formed on a right side of the auxiliary plate 45 and the left side of the side plate 6. Two first sliding columns 46 may be slidably provided at the two first sliding slots, respectively. The two first sliding columns 46 are connected with a fixed ring and the slide bar 15, respectively. A chain 47 is connected between the auxiliary plate 45 and the mixing box 1. A second sliding slot is transversely provided in a bottom end of the connecting plate 34, and a second sliding column 48 may be slidably provided in the second slot. And the second sliding column 48 may be connected with a top end of the stopper 37. According to the device for extracting polysaccharide from *Acaudina molpadioides*, the longitudinal movement stability of the mixing box 1 can be improved through slidably arranged the first sliding columns 46 in the first sliding slot. The chain 47 is capable of further increasing the stability and preventing the mixing box 1 from dropping. And the second sliding column 48 can conveniently slide in the second sliding slot to ensure that transverse movement of the stopper is more balanced and not easy to offset.

Reinforcing column groups 49 are connected between the first motor 7 and the side plate 6 as well as between the second motor 24 and the mixing box 1. The right side of the mixing box 1 is connected with a transverse plate 50. A second universal wheel 51 is arranged at a top end of the transverse plate 50, and is closely attached to a bottom end of the big rotary plate 29. And a cushion pad 52 is arranged at a top end of the transverse plate 50, and is located right below the second motor 24. According to the device for extracting polysaccharide from *Acaudina molpadioides*, the mounting stability of the first motor 7 and the second motor 24 can be improved through the two reinforcing column groups 49. The second universal wheel 51 is capable of improving the rotating stability of the big rotary plate 12 and the support effect. And the cushion pad 52 is capable of catching the second motor 24 for buffering when the second motor 24 drops accidentally during the mounting, so as to decrease the damage.

The bottom plate 5 is longitudinally provided with a fourth through slot, and a second ball group is rotatably connected inside the fourth through slot. A bottom end of the slide bar 15 passes through the second ball group and extend to a position below the bottom plate 5. A left front side, a right front side, a left rear side and a right rear side of a bottom end of the bottom plate 5 are all connected with stands 53. And bottom ends of four stands 53 are all connected with non-slip mats 54. According to the device for extracting polysaccharide from *Acaudina molpadioides*, the sliding smoothness of the slide bar 15 can be improved through the first ball group. The support effect can be improved through the four stands 53. The whole placing stability can be improved through the four non-slip mats 54. And a space can be conveniently provided by own lengths of the four stands 53 for the slide bar 15 to slide to the bottom.

A view port is formed in a front side wall of the mixing box 1, and a transparent plate 55 is hermetically arranged on the view port. According to the device for extracting polysaccharide from *Acaudina molpadioides*, an interior of the mixing box 1 can be observed conveniently through the transparent plate 55, so that the usage is more convenient.

According to the device for extracting polysaccharide from *Acaudina molpadioides* provided by the embodiment, all the above components are arranged, connected or set through welding, riveting or other common mechanical methods. Wherein, "slidably/rotatably connected" means that the components do not drop under a sliding/rotating state, and "hermetically communicated" means that two connectors are communicated and sealed. The specific structures, models and coefficient indexes of all the components are all of their own technologies, which can be implemented to achieve the beneficial effects thereof. The terms "comprising", "including" or any other variant thereof are intended to cover a non-exclusive inclusion, such that a process, method, article or device that includes a series of elements includes not only those elements, but also other elements not expressly listed, or also elements inherent to the process, method, article or device. All the above electric appliances are commonly found in the market, and can be used only by being electrically connected with each other according to a purchased instruction; and a control module is a common self-contained module, so that the control module is not repeated here.

The foregoing descriptions are only preferred embodiments of the present disclosure. It should be noted that for a person of ordinary skill in the art, several improvements and modifications may further be made without departing from the technical principle of the present disclosure. These improvements and modifications should also be deemed as falling within the protection scope of the present disclosure.

What is claimed is:

1. A device for extracting polysaccharide from *Acaudina molpadioides*, comprising:
    a mixing box, a blocking cover, a feed pipe group, a discharge pipe, a bottom plate, a side plate, a first motor, a first transmission shaft, two drive shafts, a first circular gear, two second circular gears, two rotary discs, two connecting frames, two semiarc rotary discs, a slide bar, a stop collar, a fixed link, a baffle, a first bushing group and a first sleeve spring group;
    wherein a mixing chamber is formed in the mixing box; an access hole is communicatively formed in a front side of the mixing box, the blocking cover is screwed on the access hole via bolts; a top side wall and a rear lower side of the mixing box are communicated with the feed pipe group and the discharge pipe, respectively; and wherein communication valves are arranged on both the feed pipe group and the discharge pipe; the side plate is arranged on a right side of a top end of the bottom plate; the first motor is arranged on a right side of the side plate; a first through slot is communicatively formed in the side plate, and a first bearing pedestal is arranged in the first through slot; a first ball bearing is rotatably connected in the first bearing pedestal; a right end of the first transmission shaft is connected with a left output end of the first motor, a left end of the first transmission shaft passes through the first ball bearing and extends to a left side of the side plate to be connected with a center of the first circular gear; the first transmission shaft is in interference fit with an interior of the first ball bearing; two second bearing pedestals are arranged at the left side of the side plate in a front-rear direction, and second ball bearings are rotatably connected in both the two second bearing pedestals; right ends of the two drive shafts are in interference fit with interiors of the two second ball bearings, respectively; and wherein centers of the two second circular gears are fixedly sleeved outside the two drive shafts, respectively; both the two second circular gears are engaged with the first circular gear; left ends of the two drive shafts are connected with centers of the two rotary discs, respectively; the two semiarc rotary discs are connected with the two rotary discs through two connecting frames, respectively; both a front side and a rear side of the slide bar are longitudinally connected with a plurality of first engaging teeth; both the two semiarc rotary discs are connected with a plurality of second engaging teeth; those of the plurality of first engaging teeth located on a front side of the slide bar are engaged with those of the plurality of second engaging teeth located on a front disc of the two semiarc rotary discs, or those of the plurality of first engaging teeth located on a rear side of the slide bar are engaged with those of the plurality of second engaging teeth located on a rear disc of the semiarc rotary discs; the stop collar is fixedly sleeved outside the mixing box; the fixed link is connected between the stop collar and the slide bar; the baffle is connected with the top end of the bottom plate through the first bushing group and the first sleeve spring group; the first sleeve spring group is sleeved outside the first bushing group; and the baffle is located right below the mixing box.

2. The device for extracting polysaccharide from *Acaudina molpadioides* according to claim 1, further comprising a lead screw, a slider, a connecting shaft and a plurality of agitating blades, wherein a second through slot is transversely and communicatively formed above a right side of the mixing box; a third bearing pedestal is arranged in the second through slot, and a third ball bearing is rotatably connected in the third bearing pedestal; a fourth bearing pedestal is arranged above an inner left side of the mixing box, and a fourth ball bearing is rotatably connected in the fourth bearing pedestal; a left end of the lead screw passes through the third ball bearing and extends into the mixing box to be in interference fit with an interior of the fourth ball bearing, and the lead screw is in interference fit with an interior of the third ball bearing; the slider is screwed and sleeved outside the lead screw; the connecting shaft is arranged at a bottom end of the slider; and the plurality of agitating blades are all arranged on a side wall of the connecting shaft.

3. The device for extracting polysaccharide from *Acaudina molpadioides* according to claim 2, further comprising a second motor, a second transmission shaft, a first bevel gear, a second bevel gear, a driven shaft, a big rotary plate, a small rotary plate and a third circular gear; wherein the second motor is arranged on the right side of the mixing box; two ends of the second transmission shaft are connected with a top output end of the second motor and a center of the first bevel gear, respectively; the second bevel gear is fixedly sleeved outside the driven shaft; the first bevel gear and the second bevel gear are engaged with each other; a rotary slot is provided in a left end of the big rotary plate, the small rotary plate is located in the rotary slot; a half circle of an inner peripheral side wall of the rotary slot and a half circle of an outer peripheral side wall of the small rotary plate are provided with two third engaging teeth groups; the third circular gear is engaged with one group of the two third engaging teeth groups; both centers of the small rotary plate and the big rotary plate are sleeved outside the driven shaft; a right end of the lead screw is connected with a center of the third circular gear; a fifth bearing pedestal is arranged on the right side of the mixing box, and a fifth ball bearing is rotatably connected in the fifth bearing pedestal; and a left end of the driven shaft is in interference fit with an interior of the fifth ball bearing.

4. The device for extracting polysaccharide from *Acaudina molpadioides* according to claim 1, further comprising a replenishing tank, a replenishing pipe, a connecting plate, a connecting block, a second sleeve spring, a second bushing and a stopper, wherein the replenishing tank is arranged on a left side wall of the mixing box, a holding chamber is formed in the replenishing tank; an inlet is communicatively formed in a top end of the replenishing tank; a top input end of the replenishing pipe is hermetically communicated with a bottom end of the replenishing tank; an output end of the replenishing pipe is hermetically communicated with the left side wall of the mixing box; the connecting block is connected with the inner left side of the mixing box by the connecting plate; the stopper is connected with the connecting block by the second sleeve spring and the second bushing; the second sleeve spring is sleeved outside the second bushing; and the stopper is closely attached to an output end of the replenishing pipe.

5. The device for extracting polysaccharide from *Acaudina molpadioides* according to claim 2, wherein a limit rod is connected between lower left and right sides inside the mixing box; a bottom end of the connecting shaft is connected with a connecting sheet which is transversely provided with a third through slot, and a first ball group is rotatably arranged inside the third through slot; a right end of the limit rod passes through the first ball group and extends to an outside of the connecting sheet; a bottom end of the connecting sheet is connected with a first universal wheel group; and a bottom end of the first universal wheel group is closely attached to an inner bottom side of the mixing box.

6. The device for extracting polysaccharide from *Acaudina molpadioides* according to claim 1, further comprising a push plate, a push rod, and a push block, wherein a top end of the push rod is connected with the push plate, a bottom end of the push rod is connected with the push block; a sealing layer is sleeved outside the push block, and is closely attached to an inner side wall of the holding chamber.

7. The device for extracting polysaccharide from *Acaudina molpadioides* according to claim 1, wherein a left side of the copy end of the bottom plate is connected with an auxiliary plate; two first sliding slots are longitudinally arranged on a right side of the auxiliary plate and the left side of the side plate; two first sliding columns are slidably provided at the two first sliding slots, respectively; the two first sliding columns are connected with a fixed ring and the slide bar, respectively; a chain is connected between the auxiliary plate and the mixing box; a second sliding slot is transversely formed in a bottom end of the connecting plate, and a second sliding column is slidably provided in the second sliding slot; and the second sliding column is connected with a top end of the stopper.

8. The device for extracting polysaccharide from *Acaudina molpadioides* according to claim 3, wherein reinforcing column groups are connected between the first motor and the side plate as well as between the second motor and the mixing box; the right side of the mixing box is connected with a transverse plate; a second universal wheel is arranged at a top end of the transverse plate, and is closely attached to a bottom end of the big rotary plate; and a cushion pad is arranged at a top end of the transverse plate, and is located right below the second motor.

9. The device for extracting polysaccharide from *Acaudina molpadioides* according to claim 5, wherein the bottom plate is longitudinally provided with a fourth through slot, and a second ball group is rotatably connected in the fourth through slot; a bottom end of the slide bar passes through the second ball group and extends to a position below the bottom plate; a left front side, a right front side, a left rear side and a right rear side of a bottom end of the bottom plate are all connected with stands; and bottom ends of four stands are all connected with non-slip mats.

10. The device for extracting polysaccharide from *Acaudina molpadioides* according to claim 1, wherein a view port is formed in a front side wall of the mixing box, and a transparent plate is hermetically arranged on the view port.

\* \* \* \* \*